United States Patent [19]

Challoner et al.

[11] Patent Number: 4,883,244

[45] Date of Patent: Nov. 28, 1989

[54] SATELLITE ATTITUDE DETERMINATION AND CONTROL SYSTEM WITH AGILE BEAM SENSING

[75] Inventors: A. Dorian Challoner, Manhattan Beach; U. A. von der Embse, Westchester; Mark P. Mitchell, Playa del Rey; Donald C. D. Chang, Thousand Oaks; Richard A. Fowell, Palos Verdes Estates; Ken Y. Huang, Redondo Beach; Joseph H. Hayden, Rancho Palos Verdes; Gene E. Allen, Torrance, all of Calif.

[73] Assignee: Hughes Aircraft Company, Los Angeles, Calif.

[21] Appl. No.: 137,225

[22] Filed: Dec. 23, 1987

[51] Int. Cl.[4] ............................ B64G 1/24; B64G 1/36
[52] U.S. Cl. .................................... 244/171; 244/166; 244/164; 364/459; 342/354; 342/355
[58] Field of Search ........................ 244/164, 166, 171; 364/449, 455, 456, 459; 342/352–358

[56] References Cited

U.S. PATENT DOCUMENTS

| | | | |
|---|---|---|---|
| 3,061,239 | 10/1962 | Rusk | 244/166 |
| 3,341,151 | 9/1967 | Kampinsky | 342/355 |
| 3,390,847 | 7/1968 | Crocker | 244/166 |
| 3,744,740 | 7/1973 | Godin et al. | 244/171 |
| 3,949,400 | 4/1976 | Shores | 342/356 |
| 4,617,634 | 10/1986 | Izumida et al. | 364/455 |

FOREIGN PATENT DOCUMENTS 267086  5/1988  European Pat. Off. ............ 244/171

Primary Examiner—Joseph F. Peters, Jr.
Assistant Examiner—Rodney Corl
Attorney, Agent, or Firm—Steven M. Mitchell; Wanda Denson-Low

[57] ABSTRACT

Agile (electronically steerable) beam sensing with associated on-board processing, previously used exclusively for positioning of antennas for beam formation and tracking in communications systems, is now also used for satellite active attitude determination and control. A spinning satellite (100) is nadir oriented and precessed at orbit rate using magnetic torquing determined through use of an on-board stored magnetic field model (520) and attitude and orbit estimates (212). A Kalman filter (211) predicts parameters (202, 203) associated with a received signal (204) impinging on the satellite's wide angle beam antenna (201). The antenna system measures the error between the parameter predictions and observed values and sends appropriate error signals (207) to the Kalman filter for updating its estimation procedures. The Kalman filter additionally outputs the spacecraft attitude error signals (215) to an attitude control law (213), which determines commands to attitude-altering magnetic torque elements (220) to close the control loop via the spacecraft dynamics (230).

25 Claims, 2 Drawing Sheets

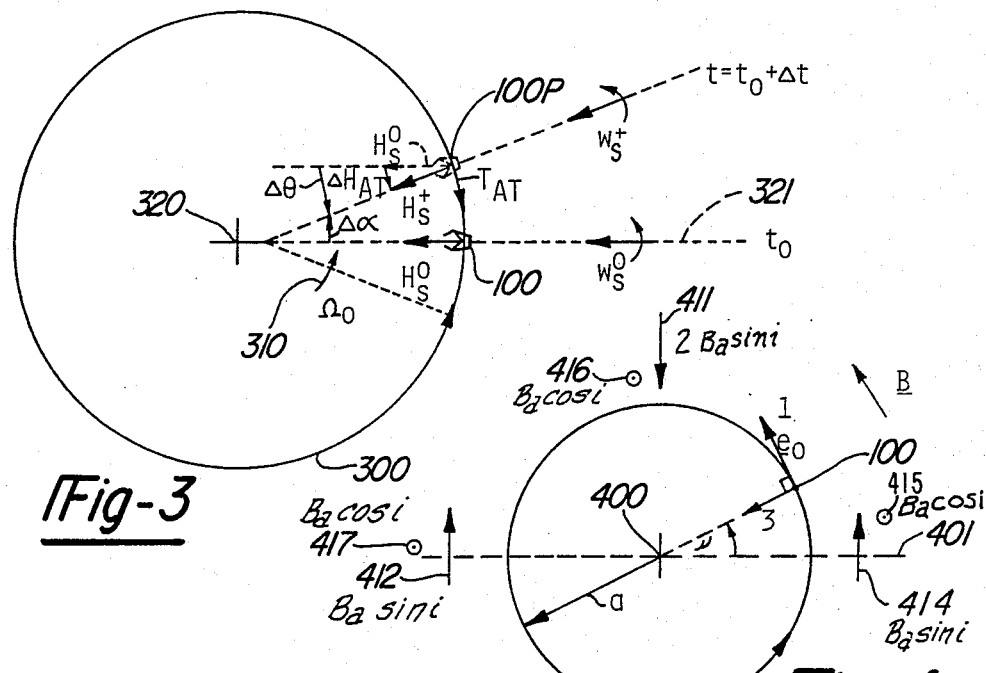
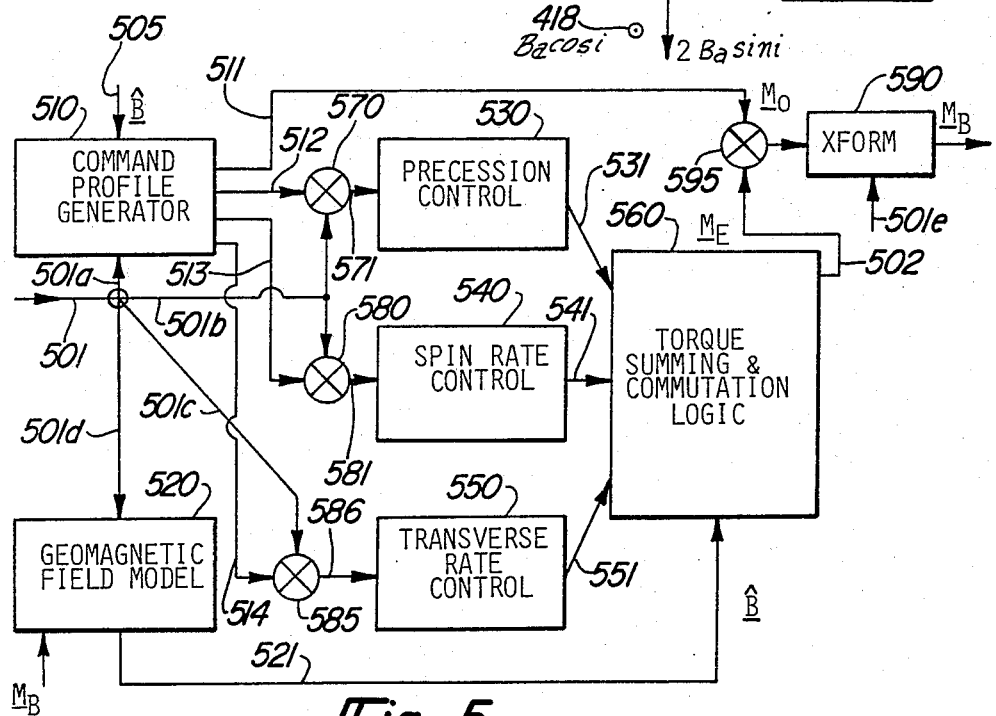

SATELLITE ATTITUDE DETERMINATION AND CONTROL SYSTEM WITH AGILE BEAM SENSING

CROSS REFERENCE TO RELATED APPLICATION

This invention is related to an application for U.S. Letters Patent entitled Spacecraft Design Enabling the Compact Nesting of Multiple Spacecraft in the Launch Vehicle, Ser. No. 083,492, filed Aug. 10, 1987, and assigned to the same assignee as this invention.

BACKGROUND OF THE INVENTION

The invention relates generally to spacecraft attitude determination and control systems. More specifically, the invention concerns attitude control of a spacecraft orbiting a celestial body in the presence of a plurality of known remote sources of radiated energy.

Studies relating to attitude control for low cost communications satellites having electronically steerable or so-called "agile" beam antennas have concluded that gravity gradient stabilization was the preferred method of attitude control. More accurate active control approaches with unspecified sensing, if any, have required various complex gear, such as pitch wheels for roll/yaw stabilization. Also, more versatile deployment methods for gravity-gradient stabilized spacecraft involving magnetic torquing have been rejected because of the perceived need for magnetometers to properly commutate the magnetic torque generating elements.

The disclosed method of the invention using agile beam sensing for attitude control provides accurate, responsive, wide angle sensing that enables full and continuous attitude determination without the need for a multiplicity of separated dedicated celestial body or inertial sensors. One embodiment of the invention provides continuous yaw rotation and thermal control by means of steady orbit rate precession of the spin axis of a single-body spinning spacecraft whose angular momentum is substantially in the oribt plane. The invention further contemplates associated magnetic torque control laws for minimizing nadir pointing errors using on-board geomagnetic field modeling derived from an agile beam-sensed state estimation.

The invention recognizes that the continuous and complete satellite attitude state estimates which are computed for agile beam formation for communications have the inherent accuracy and bandwidth which are in excess of the satellite attitude stabilization and control requirements, thus obviating separate attitude sensors for use in achieving attitude control. Additionally, the on-board continuous attitude and orbit state estimates based on agile beam sensing enable either deterministic or estimated magnetic field modeling for accurate magnetic torquing without resort to magnetometers.

It is a feature of the invention that the spacecraft agile beam communications antenna is used for determination of the spacecraft attitude.

It is another feature of this invention that the active yaw rotation attitude control law utilized yields a more uniform thermal exposure of the spacecraft components than provided with previous orbiting satellite orientations.

It is a further feature of the invention that the active maintenance of constant nadir pointing of the spacecraft spin axis and active transverse rate damping as contemplated by this invention avoids the pointing performance versus stability-trade off encountered in prior art systems, such as those utilizing passive gravity-gradient stabilization and passive magnetic libration damping.

It is still a further feature of this invention that deployment of the orbiting spacecraft will not require expulsion of propellant mass to achieve the initial spacecraft deployment rates, or deployment of mechanical appendages to augment inertia properties. The lightly damped large angle capture transients as for example, with prior art gravity gradient deployment methods are also provided. Steady nadir pointing can be achieved within one quarter orbit from separation from a spinning dispenser in a nominal injection attitude along the satellite orbit velocity direction.

It is yet a further feature of the invention that the spacecraft design is compatible with nested spacecraft designs, such as those contemplated by the invention disclosed in the above-cited co-pending related patent application.

BRIEF DESCRIPTION OF THE DRAWING

These and other objects and features of the invention will become apparent from a reading of a detailed description of a preferred embodiment, taken in conjunction with the drawing, in which:

FIG. 3 is a diagram depicting the parameters relative to the spacecraft used in deriving an attitude control low for maintaining proper nadir pointing;

FIG. 4 is a diagram showing the parameters relative to the spacecraft and the magnetic dipole of the celestial body being orbited used in determining magnetic torque generation for the desired orbit rate precession; and FIG. 5 is a functional block diagram setting forth more detail of the attitude control law section 213 of on-board processor 210 of FIG. 2.

DETAILED DESCRIPTION

Figure 1:
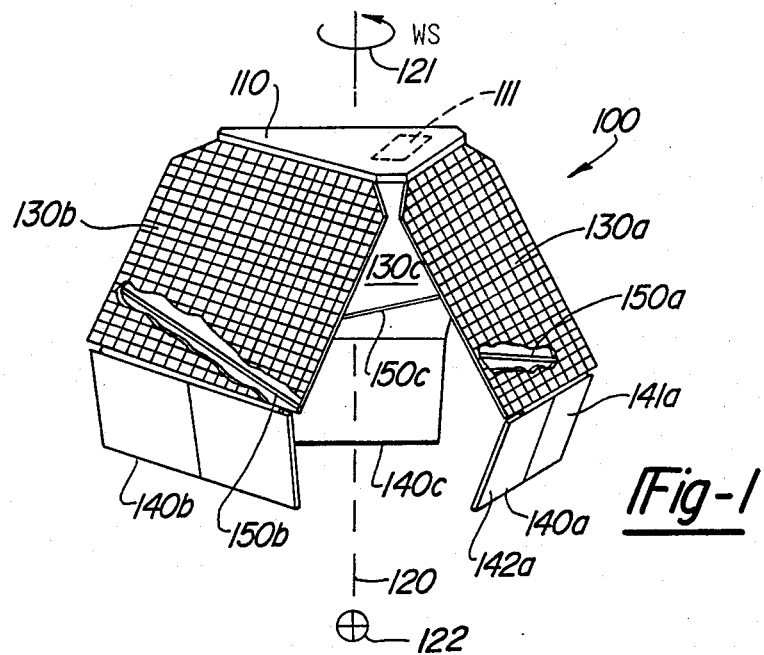
FIG. 1 is a perspective view of one of the satellites of a multiple satellite system, the satellite to be attitude controlled in accordance with the principles of the invention.

With reference to FIG. 1, a typical satellite designed for use with the attitude determination and control approach of this invention is set forth. Spacecraft 100 is of a shape and design substantially as disclosed in the above-cited related co-pending patent application. As seen from FIG. 1, satellite 100 is of substantially cup-shaped form, and comprises a polygonal base member 110 for carrying the central processor 111 to be used in the disclosed attitude control system. Coupled to each side of the base polygon are side walls, each side wall including a solar cell array 130a, 130b, 130c and a deployable agile beam antenna 140a, 140b, 140c, each antenna including a receiving section such as shown at 141a and a transmitting section such as shown at 142a. Embedded in each solar cell array are three mutually perpendicular magnetic torque control rods 150a, 150b, 150c. The control rods are used to create magnetic moments in any direction by vector summation. The rod moments are controlled by current feedback. The control rods may, for example, be cylindrical permeable rods having control windings which encircle either an air impermeable core or a permeable magnetic core.

Magnetic torquing is disclosed in the following typical U.S. Pat. Nos.:
  4,424,948—Muhlfelder et al.
  4,114,841—Muhlfelder et al.
  Re. 29,177—Michaelis
  4,062,509—Muhlfelder et al.
  4,010,921—Pistiner et al.
  4,504,912—Bruderle et al.
  4,489,383—Schmidt, Jr.

Spacecraft 100 is maintained in an attitude throughout its orbit such that its axis of symmetry and spin 120 is directed toward the nadir 122. Satellite 100 has a rotational velocity about axis 120 of $\omega_s$ designated as 121 in FIG. 1.

The general approach for the attitude determination and control provided by the invention is to provide for wide angle agile beam sensing of multiple radio frequency sources to provide required determinations or estimates of the spacecraft orbit and attitude. The sensing and attitude estimates for communication purposes have been found to also be sufficient for attitude control of the spacecraft. The spinning spacecraft is nadir oriented and precessed at an orbit rate using magnetic torquing based on a stored geomagnetic field model and the spacecraft orbit and attitude estimates. Precession, spin rate, nutation control, and magnetic field model software along with drivers for the three torque control rods are included in central processor 111. It should be noted that the system and method for attitude determination will work as well with 3-axis stabilized satellites and the attitude control systems associated therewith.

A radio frequency phased array antenna, such as found in section 140a, 140b and 140c, serves as the agile (i.e., electronically steerable) beam sensor which rapidly forms communications beams to a number of similarly designed spacecraft and ground terminals whose positions are known or estimated on-board spacecraft 100. The detected azimuth, elevation and range of each RF radiator is sent to an on-board processor 111 of satellite 100, and state estimation is effected using methods known in the art of attitude and orbit determination. Included in the satellite body sate estimate is the attitude and rate, with response time and accuracy which is adequate to effect active closed loop attitude control with magnetic torquing with either two or preferably three torque coils (or torque rods 150a, 150b, 150c). A feature of the attitude control laws used in this invention is the use of an on-board model of the geomagnetic field, either deterministic or estimated, for magnetic torquing. A novel approach is the derivation and continuous adjustment of the geomagnetic field model through use of agile-beam-sensed attitude and orbit state estimates and the on-board magnetic moment commands. This attitude control approach requires accurate, continuous estimates of satellite position in orbit (i.e., mean anomaly $v$, orbit inclination $i$, right ascension $\Omega$, and radius a), as well as satellite three-axis attitude, all of which readily arise through the use of an agile beam sensor in the spacecraft. Conventional definitions of $v$, $i$, $\Omega$, and a are set forth in FIG. 3.7, page 44 and FIG. 3.8, page 45 of "Spacecraft Attitude Determination and Control," Ed. J. R. Wertz, D. Reidel Publishing Co., 1985. Such attitude control has not heretofore been based on agile-beam sensed state information.

Figure 2:
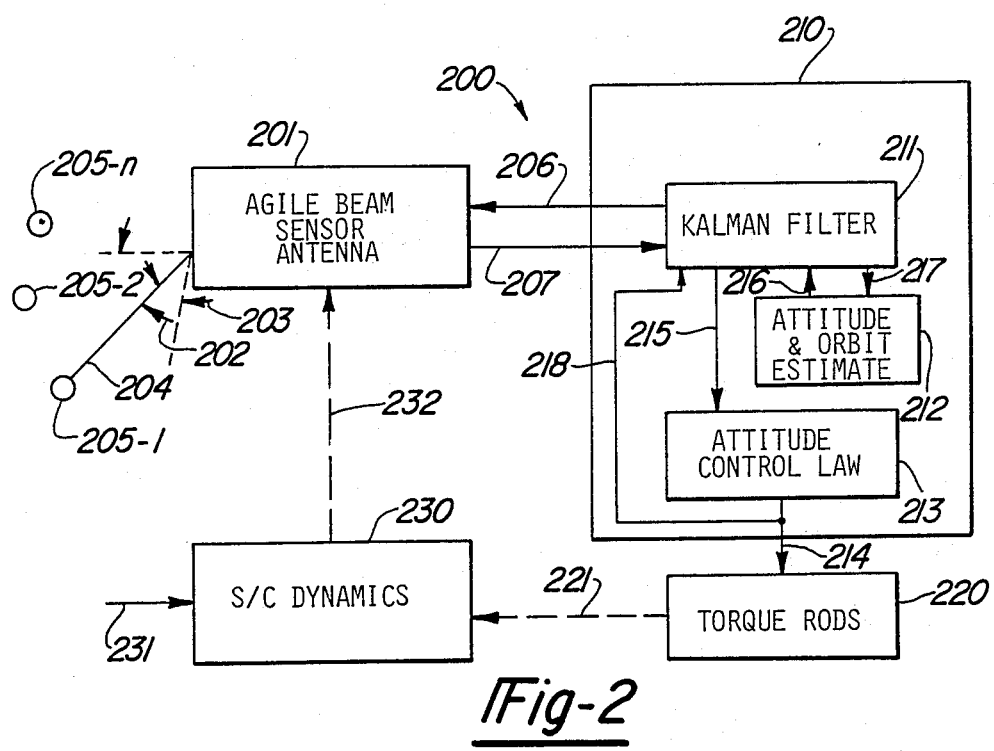
FIG. 2 is a functional block diagram of an attitude control system arranged in accordance with the principles of the invention.

A functional block diagram of the spacecraft attitude control system 200 is set forth in FIG. 2. A plurality of sources of energy, such as radio frequency information bearing signals 205-1, 205-2 through 205-n have their radiated energy sensed by an agile beam sensor 201 which is preferably a phased array antenna arranged to observe the azimuth, elevation and range of an impinging beam 204, the azimuth angle being shown as angle 202 and the elevation angle being shown as 203. The central processor 210 includes a Kalman filter 211 which provides a satellite attitude state prediction over bus 206 to the agile beam sensor 201. The agil beam sensor 201 compares the observed parameters of azimuth, elevation and range with predicted values received from Kalman filter 211 and passes error signals in these parameters over bus 207 back to the Kalman filter 211.

Central processor 210 additionally includes means for providing an attitude and orbit estimate 212 coupled to Kalman filter 211 via bus 216 and 217. Kalman filter 211 is coupled by a bus 215 to an attitude control law section 213 which is in turn coupled by a bus 214 to torque control rods 220 and by bus 218 back to Kalman filter 211. The torque control rods provide magnetic moments via path 221 to the spacecraft dynamics components 230, the dynamics section 230 additionally being exposed to the magnetic field of the celestial body being orbited by the spacecraft as indicated at 231. Changes in the spacecraft orbit and attitude resulting from torques generated by the torque control rods 220 are provided via path 232 to the agile beam sensor 201.

With the system configuration of FIG. 2, satellite rigid body attitude and orbit position state estimation based on agile beam sensing in, for example, a multiple system is implemented in the central processor 210 using a Kalman filter 211. A current satellite state estimate 212 is stored in the central processor 210 along with current estimates of several external radio frequency sources which may include other satellites in the multiple satellite system, earth terminals and other non-coherent radiators, such as other celestial bodies, as might be used for initial spacecraft deployment. From these state estimates, predictions, which may include the effect of commanded magnetic moments at 214, are made of the azimuth, elevation and range of a given RF source as part of the process taking place in Kalman filter 211. One reference disclosing an application of Kalman filtering to satellite attitude state estimation is found in chapter 13 of the above-cited Wertz reference. The attitude predictions are sent via bus 206 for use by the agile beam sensor 201 as the reference direction for narrow RF beam formation, normally for the purpose of communication with a given source (satellite or terminal). Monopulse, detection or radiometric detection is used in the agile beam sensor for azimuth and elevation errors from the reference direction, with range error determination for cooperative RF sources based on communications loop time delay measurements. These errors are combined in the Kalman filter with previous observations and an optimized correction is made to the current attitude and orbit state estimates 212.

The attitude state estimates are compared with a reference attitude profile generated within attitude control law section 213 and any errors, namely along-track and cross-track precession, spin rate errors or transverse rate errors are sensed and then corrected by closed loop magnetic torquing. The individual torque rod coil currents, and hence magnetic moments which interact with the magnetic field of the celestial body being orbited by spacecraft 100 to produce the required control torques, are computed on the basis of a stored magnetic field model in the attitude control law section 213 (see the discussion with respect to FIG. 5 set forth in a later section of this specification).

The basic control law for nadir pointing of a satellite spin axis by means of steady precession of the spin axis angular momentum at orbit rate 310 $\Omega_0$ may be described in conjunction with FIG. 3. It will be understood by those skilled in the art that the invention is not restricted to spinning satellites but may also be used with 3-axis stabilized satellites. With the satellite axis of symmetry and spin 321 aligned in the orbit plane 300 along the nadir 320 direction at time $t_0$, a steady rotation or precession $\Omega_p = \Omega_0$ of the spin axis angular momentum $H_s = I_s\omega_s$ can be maintained by application of a unidirectional along-track external torque, $T_{AT} = -\Omega_0 H_s$ antiparallel to the satellite velocity direction. This control rule is derived considering the following (with continued reference to FIG. 3):

The orbit rate is given by $\Omega_0 = \Delta\alpha/\Delta t$, while the precession rate by $\Omega_p = \Delta\theta/\Delta t = -T_{AT}/H_s$. The control approach is to set the along-track torque, $T_{AT} = -\Omega_0 H_s$, such that $\Omega_p = \Omega_0$. It should be noted in conjunction with the above equations that the spin axis momentum is $H_s = I_s\omega_s$, the along-track momentum is $\Delta H_{AT} = T_{AT}\Delta t$, while the precession angle is $\Delta\theta = \Delta H_{AT}/H_s$.

In this manner, the satellite spin axis angular momentum $H_s$ remains nadir (320) pointing and in the orbit plane 300, provided that the cross track precession torque is 0 and transverse rates are damped to their steady state values consistent with orbit rate precession.

Generation of along-track precession torque $T_{AT}$ can be achieved by use of satellite magnetic moments which interact with a central dipole field, representing, for example, substantially the earth's magnetic field, as illustrated in FIG. 4. In this case the satellite orbit 402 is assumed to be circular with radius a extending from nadir 400 and inclined with angle i relative to the dipole or magnetic equator 401 of the celestial body being orbited. FIG. 4 depicts various directional components of magnetic field strength at different positions along orbit 402. $B_a$ represents field strength magnitude at orbit radius a. Components 411 and 413 have magnitude $2B_a \sin i$, components 412 and 414 have magnitude $2B_a \sin i$, and components 415, 416, 417 and 418 have magnitude $B_a \cos i$. Representing the satellite generated moments in despun orbiting coordinates 1, 2, 3 of FIG. 4 (with coordinate 2 coming out of the page and not shown), and recognizing that magnetic torque $T = M \times B$, it is seen that $T_{AT}$ may be produced in general by an axial magnetic moment, $M_3 = T_{AT}/-B_2 = T_{AT}/B_a \cos i$, or a cross-track, magnetic moment $M_2 = T_{AT}/-B_3 = -T_{AT}/(2B_a \sin \nu \sin i)$. Cross-track precession may be nulled by insuring on average that the along-track magnetic moment $M_1 = M_3 B_1/B_3 = M_3 \cot(\nu)/2$, or $M_1 = M_3 = 0$.

For the case where a cross-trac moment component is used exclusively to generate an along-track torque and wherein spin speed is to be maintained at all times above some minimum, it follows from $T_{AT} = -M_2 B_3 = -(2M_2 B_a \sin \nu \sin i)$, that the cross track magnetic moment will change sign only at the magnetic equator ($\nu = n\pi$), for n an integer, in accord with the sign of $\sin \nu$. With this cross track moment sign variation, the axial or spin torque, $T_3 = (-M_2 B_a \cos \nu \sin i)$ will also change sign at the magnetic equatorial crossings as well as the poles ($\nu = [2n+1]\pi/2$). Thus, with cross track magnetic moment symmetric with respect to the magnetic poles, the net change in spin speed, equator to equator, will be zero, so that the minimum spin speed will occur naturally at the equator, and the maximum spin speed will occur at the poles. This may be further demonstrated by integration of the rigid body rotational equations of motion (assuming approximately zero nadir pointing error) to show that the spin speed varies as $\omega_s = \omega_{max}\sqrt{|\sin \nu|}$, where $\omega_{max}$ is the spin speed at the poles.

It is further apparent from the form of the expression for the along-track torque that for a given maximum cross-track magnetic moment component, it will not be possible (without a finite nadir pointing error) to maintain the prescribed precession rate in small angle intervals about the geomagnetic equator. Steady precession at the orbit rate, however, may still be maintained in a number of ways, as for example with the $\Omega_p = 0$ in the interval $|\nu - n\pi| < \nu_0$, $\Omega_p = 1.5 \Omega_0$ in the interval $|\nu - (2n+1)\pi/2| < 2 \nu_0$, and $\Omega_p = \Omega_0$ otherwise. The required changes in precession rate may be made without along-track rates or cross-track precession being generated if a cross-track torque is applied while the along-track torque is varied.

Simulation results for the attitude control system of the invention for a satellite in a high inclination earth orbit (i=90°, 400 nautical miles altitude) with spin inertia $I_s = 23$ Sl. Ft.$^2$, transverse inertia $I_T = 26$ Sl. Ft.$^2$, and a spin angular velocity of minimum 0.20 rpm, were generated for one complete orbit. The maximum deviation of spin axis attitude from the nadir reference direction was calculated to be 3° rss with spin speed varying from 0.20 rpm at the geomagnetic equator to a maximum of 0.72 rpm at the poles. The maximum cross track magnetic moment of 210 ATM$^2$ (or 150 ATM$^2$ when resolved into spinning torque rod coordinates) occurs where $|\nu - n\pi| = \nu_0$ is approximately equal to 2.5°.

In the simulation, steady precession $\Omega_p = \Omega_0$ is achieved as described above using $\Omega_p = 0$ for $0 < \nu < 2.5°$, $\Omega_p = \Omega_0$ for $2.5° < \nu < 84°$, $\Omega_p = 1.5\Omega_0$ for $84° < \nu < 96°$, $\Omega_p = \Omega_0$ for $96° < \nu < 177.5°$ and $\Omega_p = 0$ for $177.5° < \nu < 180°$, after which the sign of the cross-track magnetic moment is reversed and the preceding 180° precession profile is repeated in the internal $180° < \nu < 360°$. The cross track impulses required to change the precession rate $\Omega_p$ at the angle ranges given above were implemented with axial magnetic moments at the equator and along-track magnetic moments at the poles.

The effects of any magnetic torque errors will be observed as attitude errors via the agile beam sensing and state estimation apparatus. A general attitude control law, represented conceptually in FIG. 5, can thus be used to correct these errors. With reference to FIG. 5, attitude control law section 213 of the spacecraft processor includes a command profile generator 510 receiving magnetic field information via lead 505 and attitude and orbit estimates from the Kalman filter via lead 501 and lead 501a. Lead 501 is additionally coupled via lead 501b to first inputs of summing comparators 570 and 580, via lead 501c to a first input of summing comparator 585, via lead 501d to a geomagnetic field model 520 and via lead 501e to transformation unit 590.

Output lead 511 of command profile generator 510 passes required orbit-related nominal magnetic moment vector information $M_0$ via lead 511 to a first input of summing comparator 595. Output 512 of generator 510 is coupled to a second input of summing comparator 570, while generator output 513 is coupled to a second input of summing comparator 580. Generator output 514 is coupled to a second input of summing comparator 585. Output 521 of geomagnetic field model 520 passes magnetic field vector information $\hat{\underline{B}}$ to torque summing and commutation logic 560. Respective outputs 571, 581 and 586 of summing comparators 570, 580 and 585 are respectively coupled to inputs of precession control 530, spin rate control 540 and transverse rate control 550.

Output 531 of precession control 530 is coupled to torque summing and commutation logic 560, as is output 541 of spin rate control 540 and output 551 of transverse rate control 550. Torque summing and commutation logic 560 provides error vector information $M_E$ at output 502 representing the correction vector components of the magnetic moment to be summed with the nominal moment, $M_0$, and then to be combined with the earth's or other celestial body's magnetic field to produce the required attitude adjusting torque to the spacecraft.

The command profile generator 510 embodies the basic orbit rate precession control law or magnetic torque profile defined above on the basis of a known magnetic field B over an orbit. For each orbit period, the nominal along-track precession profile (on lead 512), spin rate profile (on lead 513), transverse rate profile (on lead 514) and magnetic moment $M_0$ (on lead 511) vs. orbit phase, are computed based on a current estimate of magnetic field parameters (e.g., magnetic field strength $B_a$, mean anomaly of magnetic equator and pole crossings) and maximum available magnetic moments. The precession, spin rate and transverse rate errors are computed respectively at 571, 581 and 586. Torque command generated respectively by controllers 530, 540 and 550 in response to these errors are summed and converted to despun satellite body magnetic moment vector error components represented in FIG. 5 by $M_E$ via torque summing and commutation logic 560. The total despun moments comprising $M_0$ plus $M_E$ are then transformed to $M_B$ in spinning body coordinates in transformer 590 based upon an estimated spin phase received from the Kalman filter via path 501. The output of transformer 590 may be conveniently generated as three vector components for use in generating the currents to the three torque control rods 150$a$, $b$, $c$ of FIG. 1.

Spin axis attitude (precession) deviation from the commanded profile may be corrected by closed loop control 530 using one of a number of possible methods. One approach would be to vary the amplitude and phasing of the command profile to close out the errors over the next command interval, i.e., at approximately one-quarter orbit rate. Closed loop control of spin rate at controller 540 of FIG. 5 might also be accomplished in this manner by introducing asymmetry in the torque profile with respect to the poles. Transverse rate control 550 may be implemented in one of a number of ways, for example, by continuous variation of the along-track torque in opposition to estimated along-track or transverse angular rates. Unwanted cross-track transverse rates are also damped by virtue of gyroscopic coupling with along-track rates.

For generation of accurate magnetic torques an on-board magnetic field model 521 is maintained and may either take the form of a deterministic multipole model or an estimated model, $\hat{\underline{B}}$, 521 based on estimated satellite position and attitude errors, commanded magnetic moments, $M_B$, and a satellite dynamic model including the estimated torque $\hat{\underline{T}} = M_B \times \hat{\underline{B}}$. Such a satellite dynamic model would comprise a full orbit model for generation of the precession command profile once per orbit, as well as continuous magnetic field estimates for generation of closed loop control torques at greater than orbit rate, as required.

A preferred embodiment of the invention has been described for the sake of example only. The scope and spirit of the invention is to be defined by the appended claims.

What is claimed is:

1. An on-board attitude determination system for a spacecraft orbiting a celestial body comprising:
    means for estimating the orbit and attitude of the spacecraft relative to a plurality of remote sources of coherent energy signals;
    an agile beam sensor sensing the locations of the remote sources;
    means for pointing the agile beam sensor at the estimated relative locations of the remote sources;
    means for determining error signals representative of the difference between the estimated locations of the remote sources and actual locations of the remote sources as sensed by the agile beam sensor; and
    said estimating means being adapted to receive said error signals and update the predicted orbit and attitude of the spacecraft.

2. The system of claim 1 wherein said agile beam sensor comprises an electronically steerable phased array antenna.

3. The system of claim 2 wherein the plurality of remote sources include orbiting satellites.

4. The system of claim 2 wherein the sensed locations includes azimuth, elevation and range of each remote source relative to the phased array antenna.

5. The system of claim 2 wherein said estimating means includes a Kalman filter.

6. A method of attitude control for a spacecraft orbiting a celestial body comprising the steps of:
    orienting the spacecraft such that it spins about a spin axis oriented substantially in the orbit plane and pointing substantially at nadir; and
    precessing the spin axis at a rate equal to the rotational orbit rate such that the spin axis of the spacecraft will remain substantially fixed relative to a celestial body centered coordinate frame rotating at the rotational orbit rate throughout an entire orbit for the spacecraft about the celestial body, said precessing step including the steps of:
    predicting values of preselected directional parameters relative to the spacecraft of coherent energy signals radiating from a plurality of known remote sources;
    observing the energy signals, determining values of the directional parameters from the observed energy signals, calculating differences between observed and predicted values of the directional parameters, and generating error signals indicative of the differences;
    updating the predicted parameters in accordance with the error signals and generating a spacecraft attitude state estimate from updated parameter values;
    comparing the state estimate to a reference state and generating a plurality of command signals in accordance with the comparison results; and
    generating torques upon the spacecraft such that the spin axis will precess about an axis substantially normal to an orbit plane, such as to maintain nadir pointing of the spacecraft.

7. The method of claim 6 wherein the observed values of preselected directional parameters are based on an electronically steerable agile beam of coherent energy.

8. An on-board control system for a spacecraft orbiting a celestial body comprising:
 means for predicting values of preselected directional parameters of coherent energy signals radiated from a plurality of known remote sources;
 sensing means coupled to the means for predicting and operative to observe the energy signals, to measure differences between observed and predicted values of the directional parameters, and to generate error signals indicative of the difference;
 the means for predicting including means, coupled for receipt of the error signals, for updating the predicted parameters in accordance with the error signals and for generating a spacecraft orbit and attitude state estimate from updated parameter values; and
 decision means, coupled for receipt of the state estimate, operative to compare the state estimate with a reference state and to generate at least one command signal in accordance with the comparison results.

9. The control system of claim 8 further comprising torque generating means operative to generate an attitude-adjusting torque on the spacecraft of a magnitude and direction determined by the at least one command signal.

10. The control system of claim 8 further comprising force generating means operative to generate an orbital velocity adjusting force on the spacecraft of a magnitude and direction determined by the at least one command signal.

11. The control system of claim 9 wherein the celestial body has a magnetic field and wherein the torque generating means comprises at least one magnetic moment generating means coupled for receipt of a respective command signal and operative to generate a moment having magnitude and direction appropriate for generating the torque in conjunction with the magnetic field of the celestial body.

12. The control system of claim 8 wherein the means for predicting includes a Kalman filter for estimating the directional parameters and for generating an updating the attitude state estimate.

13. The control system of claim 8 wherein the celestial body has a magnetic field and the decision means includes a stored model of the magnetic field of the celestial body.

14. The control system of claim 13 wherein the model is derived and continuously adjusted using agile-beam-sensed attitude and orbit state estimates.

15. The control system of claim 8 wherein the reference state is arranged such that a spin axis of the spacecraft will be maintained nadir pointing throughout each spacecraft orbit of the celestial body.

16. The control system of claim 11 wherein the magnetic moment generating means comprises a substantially cylindrical permeable control rod having a control winding thereon.

17. The control system of claim 16 wherein the control winding encircles an air impermeable core.

18. The control system of claim 16 wherein the control winding encircles a permeable magnetic core.

19. The control system of claim 16 wherein there are a plurality of control rods and each control rod is orthogonal to every other of the plurality of control rods.

20. The control system of claim 19 wherein there are three mutually orthogonal control rods.

21. The control system of claim 8 wherein the sensing means further comprises a phased array, steerable beam antenna.

22. The control system of claim 21 wherein the directional parameters include azimuth, elevation, and range of each remote source relative to the phased array antenna.

23. The control system of claim 22 wherein each remote source radiates coherent radio frequency information signals.

24. The control system of claim 11 wherein the decision means further comprises:
 means for generating the reference state;
 first, second and third comparison means, each having first and second inputs respectively coupled to the means for generating and the means for predicting, the first comparator having an output coupled to precession control means, the second comparator having an output coupled to spin rate control means and the third comparator having an output couplred to transverse rate control means; and
 magnetic field modeling means having an input coupled to the means for predicting;
 and wherein the magnetic-moment generating means comprises torque summing and commutation means for generating at least one command signal and having inputs respectively coupled to outputs of the precession control means, the spin rate control means, the transverse rate control means and the magnetic field modeling means, a fourth comparison means having a first input coupled to an output of the means for generating, a second input coupled to an output of the torque summing and commutation means, and transforming means for converting magnetic moment information present at an output of the fourth comparison means from despun coordinate form to spinning body coordinate form and having inputs respectively coupled to an output of the fourth comparison means to the means for predicting.

25. The control system of claim 8 wherein the plurality of known remote sources includes orbiting satellites.

* * * * *

UNITED STATES PATENT AND TRADEMARK OFFICE
CERTIFICATE OF CORRECTION

PATENT NO. : 4,883,244

DATED : November 28, 1989

INVENTOR(S) : A. Dorian Challoner, et al.

It is certified that error appears in the above-identified patent and that said Letters Patent is hereby corrected as shown below:

Col. 2, line 12, delete "provided" and insert --avoided--.

Col. 4, line 8, delete "agil" and insert --agile--.

Col. 5, line 43, delete "2Ba" and insert --Ba--.

Col. 5, line 51, insert --/-- after the second TAT.

Col. 5, line 54, delete the first "/".

Col. 5, line 55, delete " cross-trac" and insert --cross-track--.

Col. 8, line 46, delete "for" and insert --of--.

Col. 9, line 48, delete "an" and insert --and--.

Signed and Sealed this

Ninth Day of April, 1991

Attest:

HARRY F. MANBECK, JR.

Attesting Officer

Commissioner of Patents and Trademarks